United States Patent [19]

Leigh et al.

[11] Patent Number: 4,751,864
[45] Date of Patent: Jun. 21, 1988

[54] CUTTING TOOL HAVING AN INTENSIFIER

[75] Inventors: Gary G. Leigh; Robert F. Massman, both of Wilmington, Ohio

[73] Assignee: Cincinnati Milacron Inc., Cincinnati, Ohio

[21] Appl. No.: 31,978

[22] Filed: Mar. 30, 1987

[51] Int. Cl.⁴ .................................................. B23B 23/00
[52] U.S. Cl. .......................................... 82/31; 60/593
[58] Field of Search .................. 82/9, 19, 31, 36 A, 82/36 B, 14 A, 21 A, 27, DIG. 4, 2 R; 51/165.77, 165.9, 165.85, 236, 50 H, 49, 165 R; 60/593; 417/302, 392, 396, 401, 457

[56] References Cited
U.S. PATENT DOCUMENTS 2,545,852  3/1951  Kurzweil ................................ 82/31
3,279,381  10/1966  Robertson ........................... 417/401
4,249,380  2/1981  Melendy ................................ 60/593
4,625,461  12/1986  Vetter ................................... 82/31
4,625,836  12/1986  Pigott .................................. 60/593

Primary Examiner—Frederick R. Schmidt
Assistant Examiner—Blynn Shideler
Attorney, Agent, or Firm—Thomas M. Farrell; Frank C. Leach

[57] ABSTRACT

A numerically controlled lathe has its tailstock body clamped on ways of a bed at a desired position by pucks through using an intensifier to increase the hydraulic pressure applied to the pucks to three times the hydraulic source pressure. The intensifier is automatically replenished with hydraulic fluid each time that there is release of the clamping pucks.

20 Claims, 4 Drawing Sheets

CUTTING TOOL HAVING AN INTENSIFIER

This invention relates to a cutting tool having an intensifier for increasing the hydraulic pressure for locking centering means of the cutting tool at a desired position and, more particularly, to a cutting tool having an intensifier that is replenished after each time that the intensifier ceases to supply the increased hydraulic pressure.

In a cutting tool such as a numerically controlled lathe, for example, a workpiece is gripped at one end by a chuck or the like and has its other end supported on a center of a quill of a tailstock. The quill is supported for sliding movement relative to the tailstock to enable the center to engage one end of the workpiece. The quill supports the center of the workpiece as the workpiece is rotated by drive means rotating the chuck.

There can be cutting of the workpiece by either one cutting means or two cutting means. Each of the cutting means is movable along two axes so that there are four axes if there are two cutting means. Each of the cutting means is movable along an axis parallel to the longitudinal axis passing through the centers of the quill and the chuck, i.e., in an axial direction. There also is movement of each of the cutting means perpendicular to the longitudinal axis passing through the centers of the quill and the chuck, i.e., in a radial direction.

In numerically controlled lathes, each of these movements of each of the cutting means is controlled by a suitable program. Thus, there is automatic formation of each of the workpieces by the cutting means.

However, the quill of the tailstock of a numerically controlled lathe has been positioned manually. That is, the tailstock is moved to a desired position manually and then locked therein. Then, the quill is advanced hydraulically.

In the copending U.S. patent application of Gary G. Leigh and James F. Schwab for "Cutting Tool Having Positioning Means" Ser. No. 31,977, filed Mar. 30, 1987, assigned to the same assignee as the assignee of this application, and incorporated by reference herein, the tailstock is automatically positioned at a desired position under control of a software program and a programmable controller. The aforesaid Leigh et al application uses a hydraulic motor to position the tailstock at the desired position in response to the software program and the programmable controller. This avoids the necessity for a relatively expensive servo positioning axis drive of the type used to move each of the cutting means along each axis.

The hydraulic motor requires only a pressure of 600 p.s.i. to dispose the tailstock at the desired position. However, to clamp or lock the tailstock at the desired position to which it is advanced by the hydraulic motor, a substantially greater pressure is necessary to clamp pucks on the tailstock against the tool bed and the ways of the tool bed. A pressure of approximately 1,800 p.s.i. is required for this clamping.

While a hydraulic source producing 1,800 p.s.i. could be utilized, this would be very expensive. This is because of the increased cost for pumps, hoses, and other parts to handle the substantially higher pressure of 1,800 p.s.i. in comparison with 600 p.s.i. for moving the tailstock.

Since the higher pressure is required only for clamping, this would produce a very substantial increase in cost to have the entire hydraulic system at the higher pressure. Since cutting operations on a workpiece take less than half of the time while loading and unloading of a workpiece take over half the time, the higher pressure for clamping is required for less than half of the time that the tool is utilized so that having the higher pressure for the entire system would be a significant financial waste. Accordingly, the present invention employs an intensifier for increasing the hydraulic pressure solely for clamping the pucks against the tool bed and the ways.

Additionally, hydraulic fluid is always supplied to the intensifier after each release of the clamping of the pucks. This insures that there always is a supply of the hydraulic fluid in the intensifier.

The intensifier is controlled so that it increases the pressure only after the tailstock is in a desired position. Thus, the intensifier does not produce the high pressure at all times.

The intensifier is controlled to increase the pressure in accordance with when the quill within the tailstock is linearly advanced to engage one end of the workpiece to center it with respect to the other end that is held in a driven chuck. The control for positioning the tailstock and the quill is particularly shown and described in the aforesaid Leigh et al application.

An object of this invention is to provide a hydraulic intensifier for use with a cutting tool.

Another object of this invention is to provide a cutting tool in which a movable centering means is clamped against movement only after the centering means has been properly positioned and retained with a substantially higher pressure than required elsewhere by the cutting tool.

Other objects of this invention will be readily perceived from the following description, claims, and drawings.

This invention relates to a cutting tool for performing cutting operations on a workpiece including means engageable with one end of a workpiece to rotate the workpiece and centering means engageable with the other end of the workpiece to maintain the workpiece aligned on a desired axis. Cutting means performs at least one cutting operation on the workpiece. The centering means is advanced by advancing means to a desired position and locked by locking means at the desired position. The locking means includes means engageable with a fixed structure and means to apply a hydraulic fluid to the engageable means to render the engageable means effective. The applying means includes a hydraulic source applying hydraulic fluid at a first pressure, an intensifier receiving hydraulic fluid from the hydraulic source and increasing the fluid pressure from the hydraulic source to a second pressure at least twice as great as the first pressure, means to supply fluid at the second pressure from the intensifier to the engageable means, and means to return hydraulic fluid to the intensifier at the first pressure from the hydraulic source when hydraulic fluid is removed from application to the engageable means to render the locking means ineffective.

The attached drawings illustrate a preferred embodiment of the invention, in which.

Figure 1:
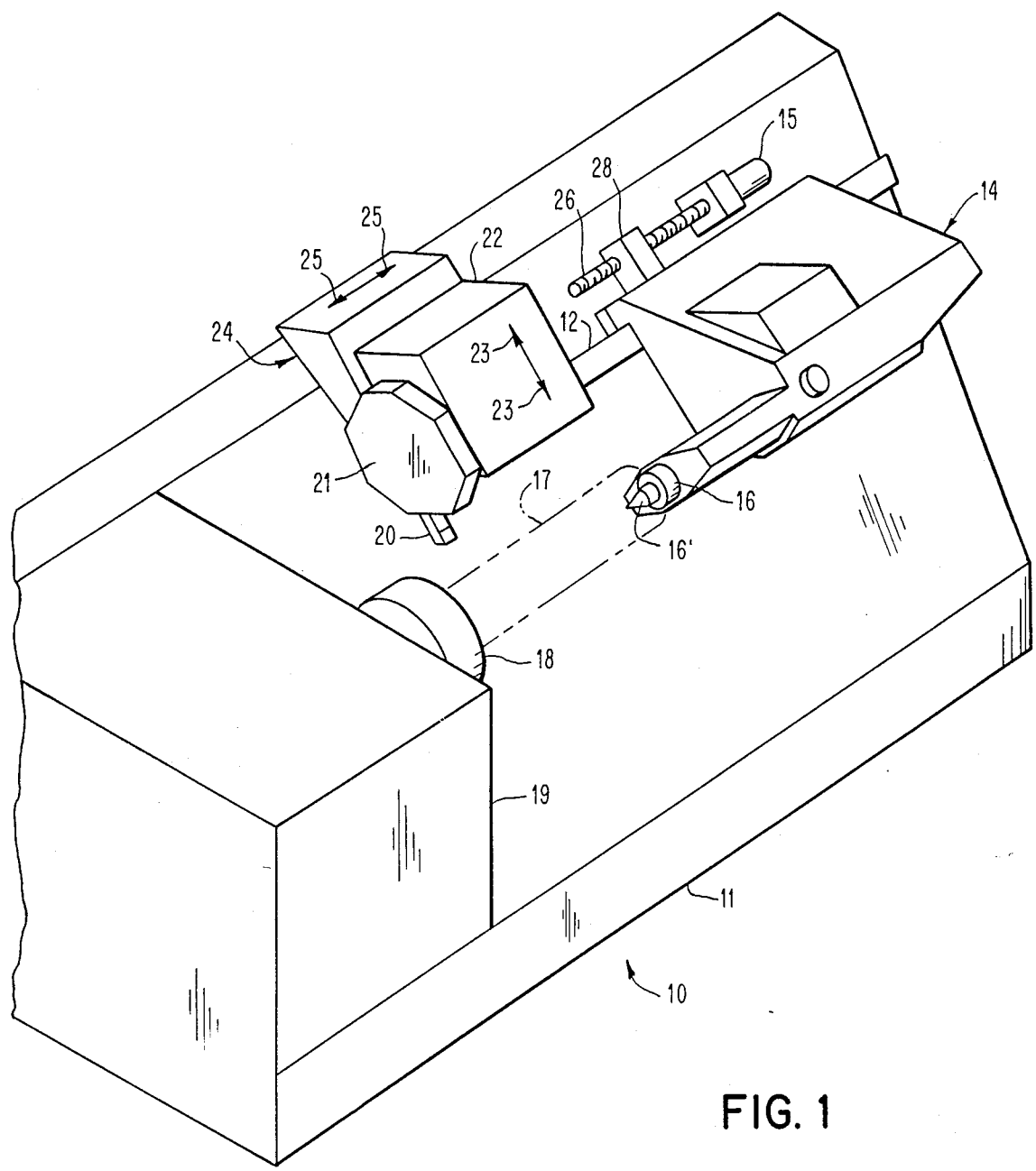
FIG. 1 is a schematic perspective view of a numerically controlled lathe with which an intensifier is used.

Referring to the drawings and particularly FIG. 1, there is shown a cutting tool such as a numerically controlled lathe 10. The lathe 10 includes a bed 11 having a pair of substantially parallel ways 12 and 13 (see FIGS. 2 and 4) mounted thereon. A tailstock body 14 (see FIG. 1) is moved along the ways 12 and 13 (see FIG. 2) by a hydraulic rotary motor 15.

The tailstock body 14 (see FIG. 1) has a quill 16 slidably supported therein for relative longitudinal or linear movement with respect to the tailstock body 14. The quill 16 rotatably supports a center 16' although the center 16' does not have to be rotatable.

The center 16' of the quill 16 engages one end of a workpiece or part 17 (shown in phantom) through being disposed in a hole that is center drilled in the workpiece 17 prior to the workpiece 17 being positioned for engagement by the center 16'. The other end of the workpiece 17 is supported in a chuck 18, which is rotatably mounted in a headstock 19 and rotated by suitable drive means (not shown) in the well-known manner.

The workpiece 17 has cutting operations performed on it by one or more cutting elements 20 (one shown), which are mounted in a numerically controlled turret 21. The turret 21 is rotatably supported in a cross slide 22 to position a different one of the cutting elements 20 in position for performing a cutting operation on the workpiece 17. The cross slide 22 moves along an axis in the directions indicated by arrows 23. The cross slide 22 is driven by a DC servo drive in the well-known manner.

The cross slide 22 moves relative to a carriage 24. The carriage 24 moves along an axis in the directions of arrows 25 and is driven by a DC servo drive in the well-known manner. Thus, there is movement of the cutting element 20 along two different axes with the carriage 24 producing motion along a first axis and the cross slide 22 producing motion along a second axis, which is substantially orthogonal to the first axis.

The tailstock body 14 is moved to a desired position by the hydraulic motor 15 through a ball screw 26 (see FIG. 2) cooperating with a ball nut 27 mounted in a bracket 28 on the tailstock body 14. The motion of the tailstock body 14 by the hydraulic motor 15 is more particularly shown and described in the aforesaid Leigh et al application.

The direction of rotation of the hydraulic motor 15 is controlled by the position of a three-way solenoid valve 29 as more particularly shown and described in the aforesaid Leigh et al application. Hydraulic fluid is supplied to the hydraulic motor 15 through the solenoid valve 29 from a hydraulic source 30 having a pressure of 600 p.s.i.. One suitable example of the solenoid valve 29 is sold by Parker-Hannifin Corporation as model No. D1VW1CY.

After the tailstock body 14 is disposed at the desired position, it is necessary to lock the tailstock body 14 to the bed 11 (see FIG. 1) and the ways 12 and 13 (see FIG. 2) and to advance the quill 16 from the tailstock body 14. Accordingly, a directional control valve 31 has its solenoid 32 deenergized to allow a spring 32' to shift the directional control valve 31 to the position of FIG. 2. This supplies the hydraulic fluid under a pressure of 600 p.s.i. from the source 30 through a line 33. One suitable example of the directional control valve 31 is sold by Parker-Hannifin Corporation as Model No. D1RW-20VYF.

Figure 2:
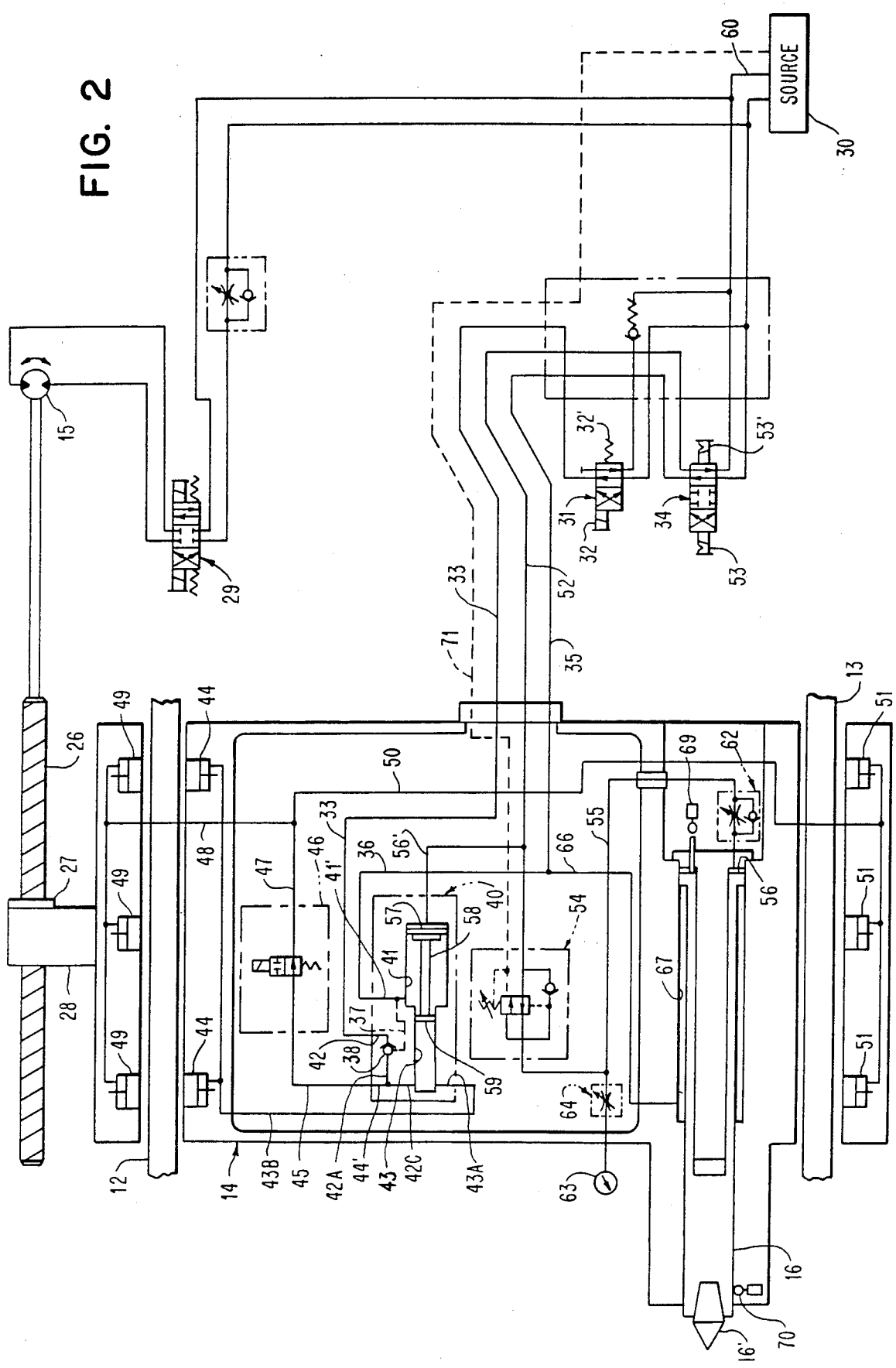
FIG. 2 is a schematic view of a numerically controlled lathe and a hydraulic arrangement including an intensifier utilized with the lathe to lock a tailstock body of the lathe in a desired position.

At this time, a directional control valve 34 is in the position of FIG. 2 so that hydraulic fluid under a pressure of 600 p.s.i. from the source 30 exists in lines 35, 36 and 66. One suitable example of the directional control valve 34 is a directional control valve sold by Parker-Hannifin Corporation as model No. D1RW-10VYF.

The line 36 is connected through a pilot line 37 to control when a check valve 38 functions. One suitable example of the check valve 38 is a KEPSEL cartridge lock valve insert sold as model No. 2746 by Kepner Products, Villa Park, Il.

Figure 3:
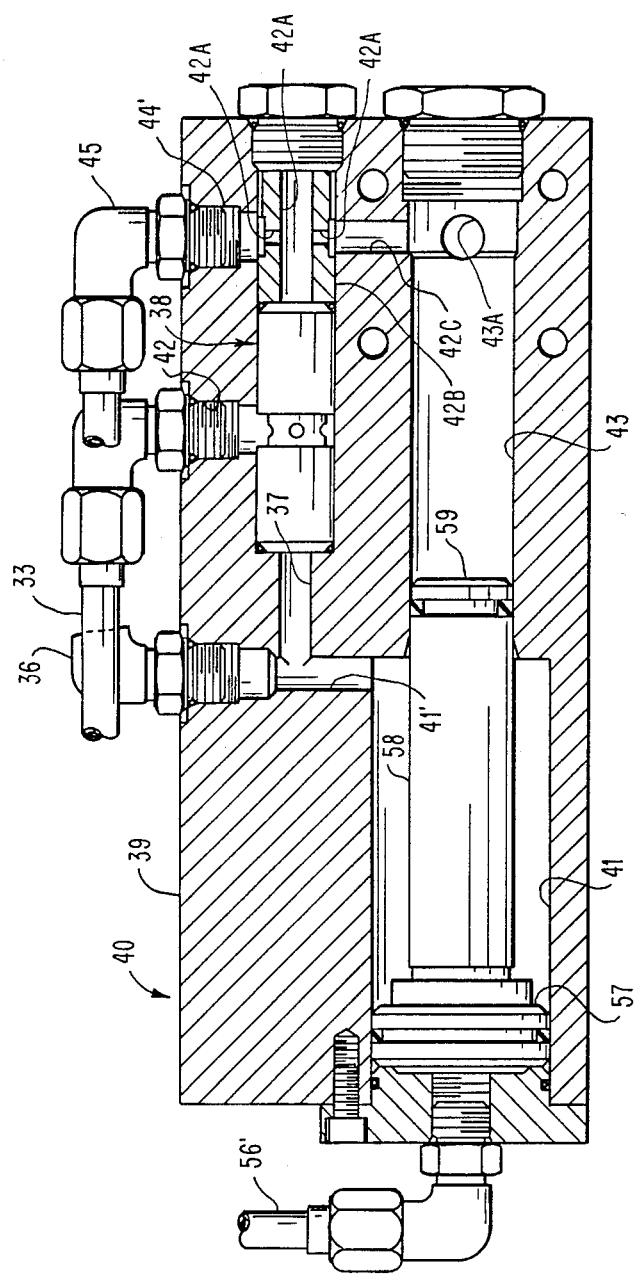
FIG. 3 is a sectional view of the intensifier of the present invention for increasing the hydraulic pressure.

The pilot line 37 is a passage within a body 39 (see FIG. 3) of an intensifier 40. The line 36 communicates with a first chamber 41 in the body 39 of the intensifier 40 through a passage 41' in the body 39 to replenish the hydraulic fluid at a pressure of 600 p.s.i. each time that the intensifier 40 is inactivated.

The deenergization of the solenoid 32 (see FIG. 2) to shift the directional control valve 31 to the position of FIG. 2 results in hydraulic fluid at a pressure of 600 p.s.i. being supplied from the 33 through a passage 42 (see FIG. 3) in the body 39, past the check valve 38, and through passages 42A in a spacer 42B in the body 39 and a passage 42C in the body 39 to a second chamber 43 within the body 39. Since the pilot line 37 has a pressure of 600 p.s.i. therein, the check valve 38, which prevents flow from the passages 42A in the spacer 42B to the passage 42, is not effective at this time.

Figure 4:
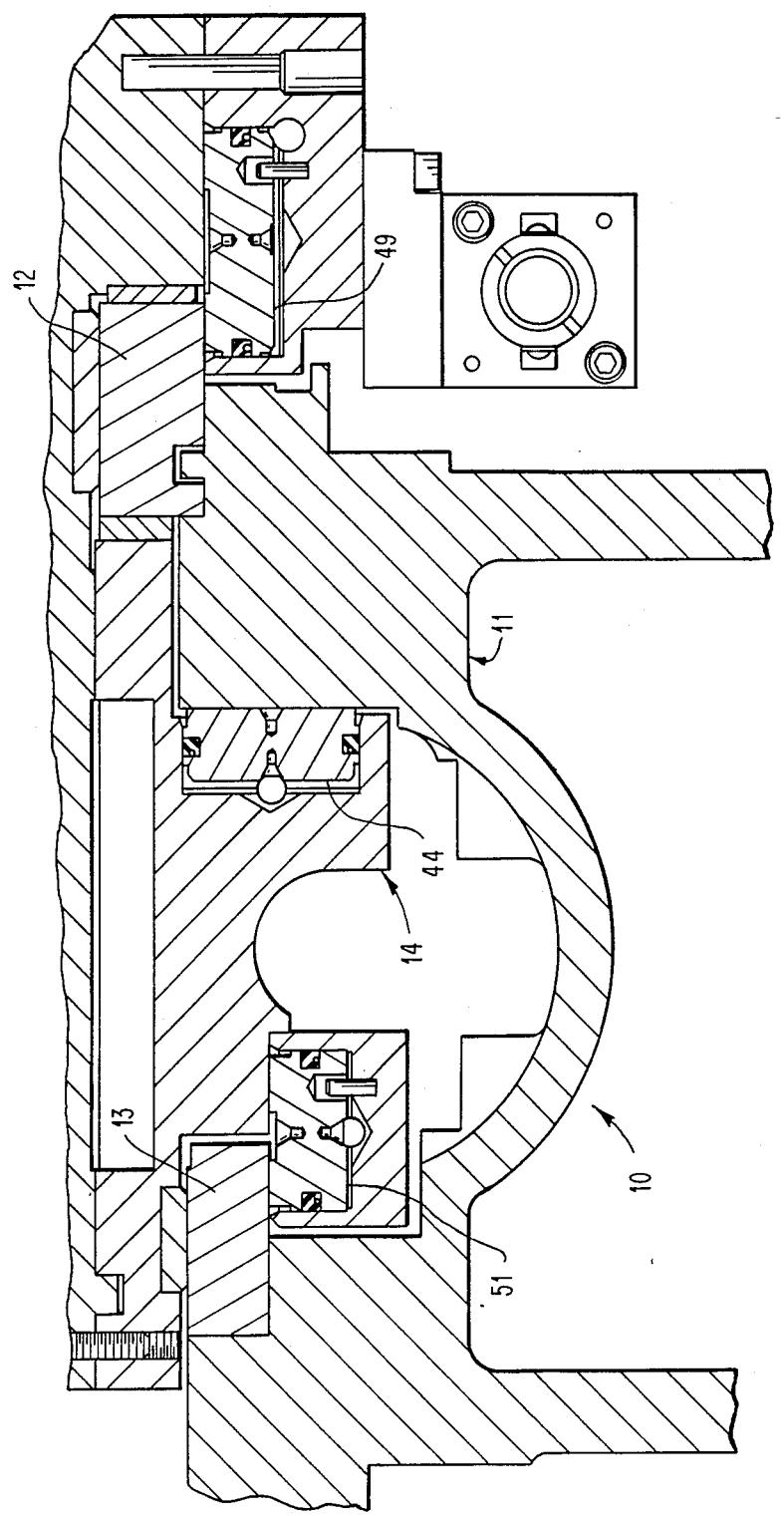
FIG. 4 is a sectional view showing the clamping of the tailstock body.

The hydraulic fluid is supplied at a pressure of 600 p.s.i. from the second chamber 43 in the body 39 through a passage 43A in the body 39 and a line 43B (see FIG. 2) to a first set of two round pucks 44, which clamp against the bed 11 (see FIG. 4). Each of the pucks 44 has the hydraulic fluid applied thereto to clamp each of the pucks 44 against the bed 11 to prevent movement of the tailstock body 14 (see FIG. 1) from the desired position to which it has been advanced by the hydraulic motor 15 in the manner more particularly shown and described in the aforesaid Leigh et al application.

The hydraulic fluid in the line 33 (see FIG. 3) also flows past the check valve 38 through the passages 42A in the spacer 42B, a passage 44' in the body 39, and a line 45 to a sequence valve 46 (see FIG. 2). One suitable example of the sequence valve 46 is a sequence valve sold by Sun Hydraulics Corporation, Sarasota, Fla., as Model No. Y5DA-FAN-AI. The sequence valve 46 delays for a slight time period such as 0.5 second, for example, the supply of the hydraulic fluid through lines 47 and 48 to a second set of three round pucks 49 and through the line 47 and a line 50 to a third set of three round pucks 51.

As shown in FIG. 4, the pucks 49, which clamp against the way 12, are disposed at 90° to the pucks 44. The pucks 51, which clamp against the way 13, clamp in the same direction as the pucks 49.

The pucks 44 are clamped to the bed 11 prior to the pucks 49 and 51 being clamped against the ways 12 and 13, respectively, to insure that the quill 16 (see FIG. 1) and the center 16' are aligned with the center of the chuck 18. The weight of the tailstock body 14 causes the tailstock body 14 to tend to be pulled down if the tailstock body 14 is not initially clamped against the bed 11 by the pucks 44 (see FIG. 2).

After the pucks 44, 49, and 51 have been clamped with the pressure of 600 p.s.i., it is necessary to apply a much higher hydraulic pressure to the pucks 44, 49, and 51 when the quill 16 is to be advanced for the center 16' to engage the workpiece 17 (see FIG. 1). This much higher pressure is needed when the center 16' of the quill 16 is engaging the workpiece 17 to maintain it in position as the workpiece 17 is rotated by the chuck 18.

Accordingly, to advance the quill 16 from the tailstock body 14, the directional control valve 34 is shifted from the position of FIG. 2 to supply the hydraulic fluid under pressure from the source 30 through a line 52. This is accomplished by a programmable controller of the aforesaid Leigh et al application causing energization of a solenoid 53 of the directional control valve 34 and deenergization of a solenoid 53'.

The hydraulic fluid is supplied from the line 52 to a pressure reducing valve 54 and the intensifier 40. One suitable example of the pressure reducing valve 54 is sold by Sun Hydraulic Corporation, Sarasota, Fla., as model No. 8502-191-A02. The valve 54 reduces the pressure of the hydraulic fluid supplied through a line 55 to a chamber 56 in the tailstock body 14 to advance the quill 16 longitudinally relative to the tailstock body 14 to cause the center 16' of the quill 16 to engage one end of the workpiece 17 (see FIG. 1).

The line 52 (see FIG. 2) supplies the hydraulic fluid to the intensifier 40 from the source 30 through a line 56' to the first chamber 41 in the body 39 of the intensifier 40 to act on the upstream side of a first piston 57 within the first chamber 41. The first piston 57 has a cylinder 58 (see FIG. 3) integral therewith and extending from its downstream side. The free end of the cylinder 58 constitutes a second piston 59 disposed within the second chamber 43 in the body 39.

The shifting of the directional control valve 34 (see FIG. 2) from the position of FIG. 2 also connects the line 36 to an exhaust line 60 communicating with the hydraulic source 30 to return the hydraulic fluid to the hydraulic source 30. This removes the pressure from the line 36 so that the hydraulic fluid is removed from the first chamber 41 (see FIG. 3) in the body 39 as the first piston 57 is advanced within the first chamber 41 by the hydraulic fluid supplied through the line 56'. This removal of the pressure from the pilot line 37 renders the check valve 38 effective to prevent hydraulic fluid flow from the passages 42A in the spacer 42B into the passage 42.

The ratio of the cross sectional area of the first chamber 41 to the cross sectional area of the second chamber 43 is inversely proportional to the ratio of the pressure supplied through the line 56' to the pressure in each of the passages 42C and 43A in the body 39 of the intensifier 40. Thus, by making the cross sectional area of the first chamber 41 three times the cross sectional area of the second chamber 43, the pressure in each of the passages 42C and 43A is three times the pressure in the input line 56'. Therefore, with the source 30 (see FIG. 2) supplying hydraulic fluid having a pressure of 600 p.s.i., each of the passages 42C (see FIG. 3) and 43A supplies hydraulic fluid having a pressure of 1,800 p.s.i.

The passage 43A in the body 39 of the intensifier 40 is connected by the line 43B (see FIG. 2) to supply hydraulic fluid at 1,800 p.s.i. to the pucks 44 clamping against the bed 11 (see FIG. 4). The passage 42C (see FIG. 3) in the body 39 of the intensifier 40 is connected through the passage 44' in the body 39 to the line 47 (see FIG. 2) to supply hydraulic fluid at 1,800 p.s.i. to the pucks 49 and 51. The sequence valve 46 is not effective at this time.

The line 55 has a flow control valve 62 therein to control the rate at which the quill 16 is advanced from the tailstock body 14 by the supply of hydraulic fluid to the chamber 56. One suitable example of the flow control valve 62 is a flow control valve sold by Parker-Hannifin Corporation as model No. PF600B. Thus, the rate at which the quill 16 is advanced from the tailstock body 14 is controlled as desired.

The line 55 has a pressure gage 63 connected thereto through a gage snubber 64. The gage snubber 64 protects the gage 63 from pressure spikes occurring in the line 55. One suitable example of the gage snubber 64 is sold by Sun Hydraulics Corporation, Sarasota, Fla., as model No. NSAB-KXV-AA.

When the cutting operations performed on the workpiece 17 (see FIG. 1) by the cutting elements 20 (one shown) are completed, the center 16' of the quill 16 is withdrawn from the workpiece 17 prior to removing the workpiece 17 from the chuck 18. The center 16' of the quill 16 is withdrawn from the workpiece 17 through the programmable controller of the aforesaid Leigh et al application causing energization of the solenoid 53'(see FIG. 2) of the directional control valve 34 and deenergization of the solenoid 53. This shifts the directional control valve 34 to the position shown in FIG. 2.

This position of the directional control valve 34 directs the hydraulic fluid at the pressure of 600 p.s.i. from the hydraulic source 30 through the line 35 and the line 66 to a chamber 67 in the tailstock body 14. This shift in position of the directional control valve 34 also communicates the chamber 56 in the tailstock body 14 via the line 52 to the exhaust line 60 communicating with the hydraulic source 30 to return the hydraulic fluid to the hydraulic source 30. Thus, the quill 16 may be easily retracted into the tailstock body 14 when hydraulic fluid is supplied to the chamber 67 in the tailstock body 14 with a limit switch 69 being activated when the quill 16 is fully retracted.

At the same time, the connection of the line 52 to the exhaust line 60 removes the hydraulic pressure from the first chamber 41 (see FIG. 3) in the body 39 of the intensifier 40. As a result, the first piston 57 and the second piston 59 return to the position of FIG. 3.

The shifting of the first piston 57 and the second piston 59 removes the pressure of 1,800 p.s.i. from the output passages 42C and 43A in the body 39 of the intensifier 40. This results in the hydraulic pressure acting on the pucks 44 (see FIG. 2), 49, and 51 being reduced to 600 p.s.i.

To move the pucks 44, 49, and 51 from their clamping positions, it is necessary to energize the solenoid 32 to shift the directional control valve 31 from the position of FIG. 2. This connects the line 33 with the exhaust line 60 to remove pressure in the line 33. Removal of the pressure in the line 33 results in the pressure in the second chamber 43 (see FIG. 3) in the body 39 also being exhausted through the line 33 because the check valve 38 is rendered ineffective. This is because the pilot line 37 has hydraulic fluid at a pressure of 600 p.s.i. therein because of the directional control valve 34 (see FIG. 2) having been shifted to the position of FIG. 2 prior to the directional control valve 31 being shifted from the position of FIG. 2. This removal of the hydraulic fluid from the second chamber 43 (see FIG. 3) in the body 39 results in the pucks 44, (see FIG. 2) 49, and 51 no longer having any hydraulic pressure applied thereto and being released from their clamping positions. Thus, if desired, the tailstock body 14 can be moved away from the chuck 18 (see FIG. 1) to enable easier unloading of the workpiece 17.

When the directional control valve 34 (see FIG. 2) is shifted to the position of FIG. 2 by energizing the solenoid 53' and deenergizing the solenoid 53, the hydraulic fluid in the line 35 also is supplied through the line 36 and the passage 41' (see FIG. 3) in the body 39 of the intensifier 40 to the first chamber 41 in the body 39. This replenishes the hydraulic fluid within the first chamber 41 in the body 39 of the intensifier 40 at 600 p.s.i. to insure that the intensifier 40 is always filled with hydraulic fluid after being inactivated. Thus, there is always replenishment of the hydraulic fluid supply within the intensifier 40 after each time that the high pressure of 1,800 p.s.i. is removed.

If the workpiece 17 (see FIG. 1) should be absent when the quill 16 is advanced from the tailstock body 14, the quill 16 will engage a proximity switch 70 (see FIG. 2). This will indicate that the workpiece 17 (see FIG. 1) is not present since the quill 16 has been advanced beyond the position to which it could advance if the workpiece 17 were present.

A drain line 71 (see FIG. 2) extends from the pressure reducing valve 54 to the source 30. This allows draining of the hydraulic fluid from the pressure reducing valve 54 when it is inactivated.

An advantage of this invention is that increased clamping pressure is obtained without having to use an increased pump pressure. Another advantage of this invention is that hydraulic fluid in the intensifier is automatically refilled after release of each clamping.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. A cutting tool for performing cutting operations on a workpiece including:
    means engageable with one end of a workpiece to rotate the workpiece;
    centering means engageable with the other end of the workpiece to maintain the workpiece aligned on a desired axis;
    cutting means for performing at least one cutting operation on the workpiece;
    advancing means to advance said centering means to a desired position;
    means to lock said centering means at the desired position;
    said locking means including:
        means engageable with a fixed structure;
        and means to apply a hydraulic fluid to said engageable
    means to render said engageable means effective;
    and said applying means including:
        a hydraulic source supplying hydraulic fluid at a first pressure;
        an intensifier receiving hydraulic fluid from said hydraulic source and increasing the fluid pressure from said hydraulic source to a second pressure at least twice as great as the first pressure;
        first supply means to supply fluid at the second pressure from said intensifier to said engageable means;
        and means to return hydraulic fluid to said intensifier at the first pressure from said hydraulic source when hydraulic fluid is removed from application to said engageable means of said locking means to render said locking means ineffective.

2. The cutting tool according to claim 1 in which:
    said centering means includes:
        a tailstock body mounted on the fixed structure for linear motion;
        a quill slidably supported in said tailstock body for longitudinal movement relative to said tailstock body; and said quill having support means for engaging the workpiece;
    said engageable means of said locking means locks said tailstock body to the fixed structure;
    and means slidably advances said quill relative to said tailstock body after said locking means locks said tailstock body to the fixed structure to enable said support means to engage the workpiece.

3. The cutting tool according claim 2 in which:
    said intensifier includes:
        a body;
        a first chamber in said body;
        a second chamber in said body communicating with said first chamber, said first chamber having a substantially larger cross sectional area than said second chamber, the ratio of the second pressure to the first pressure being inversely proportional to the ratio of the cross sectional area of said first chamber to the cross sectional area of said second chamber;
        a first piston slidable in said first chamber;
        a second piston slidable in said second chamber;
        said first piston and said second piston being movable together;
        and means to introduce fluid from said hydraulic source into said first chamber to act on the upstream side of said first piston to move said first piston and said second piston together to increase the hydraulic fluid pressure in said second chamber to the second pressure;
    and said first supply means communicates with said second chamber of said intensifier downstream of said second piston.

4. The cutting tool according claim 3 including means to return hydraulic fluid to said first chamber at the first pressure downstream of said first piston when said hydraulic source ceases to supply fluid at the first pressure to act on the upstream side of said first piston.

5. The cutting tool according to claim 1 in which:
    said intensifier includes:
        a body;
        a first chamber in said body; a second chamber in said body communicating with said first chamber, said first chamber having a substantially larger cross sectional area than said second chamber, the ratio of the second pressure to the first pressure being inversely proportional to the ratio of the cross sectional area of said first chamber to the cross sectional area of said second chamber;
        a first piston slidable in said first chamber;
        a second piston slidable in said second chamber;

said first piston and said second piston being movable together;

means to introduce fluid from said hydraulic source into said first chamber to act on the upstream side of said first piston to move said first piston and said second piston together to increase the hydraulic fluid pressure in said second chamber to the second pressure;

and said first supply means communicates with said second chamber of said intensifier downstream of said second piston.

6. The cutting tool according to claim 5 including means to return hydraulic fluid to said first chamber at the first pressure downstream of said first piston when said hydraulic source ceases to supply fluid at the first pressure to act on the upstream side of said first piston.

7. The cutting tool according to claim 1 in which said applying means includes second supply means to supply hydraulic fluid from said hydraulic source at the first pressure to said engageable means of said locking means prior to fluid being supplied at the second pressure from said intensifier.

8. A cutting tool for performing cutting operations on a workpiece including:

means engageable with one end of a workpiece to rotate the workpiece;

centering means engageable with the other end of the workpiece to maintain the workpiece aligned on a desired axis;

cutting means for performing at least one cutting operation on the workpiece;

advancing means to advance said centering means to a desired position;

means to lock said centering means at the desired position;

said locking means including:
  means engageable with a fixed structure;
  and means to apply a hydraulic fluid to said engageable means to render said engageable means effective;

said engageable means of said locking means including first enageable means and second engageable means engageable with the fixed structure at approximately 90° to each other;

said applying means including:
  a hydraulic source supplying said hydraulic fluid to a first pressure;
  an intensifier receiving hydraulic fluid from said hydraulic source and increasing the fluid pressure from said hydraulic source to a second pressure at least twice as great as the first pressure;
  first supply means to supply fluid at the second pressure from said intensifier to said first engageable means of said locking means and said second engageable means of said locking means,
  second supply means to supply hydraulic fluid from said hydraulic source at the first pressure to said first and second engageable means of said locking means prior to fluid being supplied at the second pressure from said intensifier;
  and means to return hydraulic fluid to said intensifier at the first pressure from said hydraulic source when hydraulic fluid is removed from application to said first engageable means of said locking means and said second engageable means of said locking means to render said locking means ineffective;
  and means to render said first engageable means of said locking means effective prior to said second engageable means of said locking means when said second supply means supplies the hydraulic fluid at the first hydraulic pressure from said hydraulic source.

9. The cutting tool according to claim 8 in which:
said intensifier includes:
a body;
a first chamber in said body;
a second chamber in said body communicating with said first chamber, said first chamber having a substantially larger cross sectional area than said second chamber, the ratio of the second pressure to the first pressure being inversely proportional to the ratio of the cross sectional area of said first chamber to the cross sectional area of said second chamber;
a first piston slidable in said first chamber;
a second piston slidable in said second chamber;
said first piston and said second piston being movable together;

and means to introduce fluid from said hydraulic source into said first chamber to act on the upstream side of said first piston to move said first piston and said second piston together to increase the hydraulic fluid pressure in said second chamber to the second pressure;

and said supply means communicates with said second chamber of said intensifier downstream of said second piston.

10. The cutting tool according to claim 9 including means to return hydraulic fluid to said first chamber at the first pressure downstream of said first piston when said hydraulic source ceases to supply fluid at the first pressure to act on the upstream side of said first piston.

11. The cutting tool according to claim 8 in which:
said centering means includes:
  a tailstock body mounted on the fixed structure for linear motion;
  a quill slidably supported in said tailstock body for longitudinal movement relative to said tailstock body;
  and said quill having support means for engaging the workpiece;
said first and second engageable means of said locking means lock said tailstock body to the fixed structure;
and means slidably advances said quill relative to said tailstock body after said locking means locks said tailstock body to the fixed structure to enable said support means to engage the workpiece.

12. The cutting tool according to claim 11 in which:
said intensifier includes:
  a body;
  a first chamber in said body;
  a second chamber in said body communicating with said first chamber, said first chamber having a substantially larger cross sectional area than said second chamber, the ratio of the second pressure to the first pressure being proportional to the ratio of the cross sectional area of said first chamber to the cross sectional area of said second chamber;
  a first piston slidable in said first chamber;
  a second piston slidable in said second chamber;
  said first piston and said second piston being movable together;

and means to introduce fluid from said hydraulic source into said first chamber to act on the upstream side of said first piston to move said first piston and said second piston together to increase the hydraulic fluid pressure in said second chamber to the second pressure;

and said first supply means communicates with said second chamber of said intensifier downstream of said second piston.

13. The cutting tool according to claim 12 including means to return hydraulic fluid to said first chamber at the first pressure downstream of said first piston when said hydraulic source ceases to supply fluid at the first pressure to act on the upstream side of said first piston.

14. A cutting tool for performing cutting operations on a workpiece including:
    means engageable with one end of a workpiece to support the one end of the workpiece;
    centering means engageable with the other end of the workpiece to maintain the workpiece aligned on a desired axis;
    cutting means for performing at least one cutting operation on the workpiece;
    advancing means to advance said centering means relative to said engageable means to a desired position;
    means to lock said centering means at the desired position;
    said locking means including:
        means engageable with a fixed structure;
        and means to apply a hydraulic fluid to said engageable means to render said engageable means effective;
    and said applying means including:
        a hydraulic source supplying hydraulic fluid at a first pressure;
        an intensifier receiving hydraulic fluid from said hydraulic source and increasing the fluid pressure from said hydraulic source to a second pressure at least twice as great as the first pressure;
        first supply means to supply fluid at the second pressure from said intensifier to said engageable means;
        and means to return hydraulic fluid to said intensifier at the first pressure from said hydraulic source when hydraulic fluid is removed from application to said engageable means of said locking means to render said locking means ineffective.

15. The cutting tool according to claim 14 in which: said engageable means of said locking means includes first engageable means and second engageable means engageable with the fixed structure at approximately 90° to each other;
    said applying means includes second supply means to supply hydraulic fluid from said hydraulic source at the first pressure to said first and second engageable means of said locking means prior to fluid being supplied at the second pressure from said intensifier;
    and means to render said first engageable means of said locking means effective prior to said second engageable means of said locking means when said second supply means supplies the hydraulic fluid at the first hydraulic pressure from said hydraulic source.

16. The cutting tool according to claim 15 in which: said centering means includes:
    a tailstock body mounted on the fixed structure for linear motion;
    a quill slidably supported in said tailstock body for longitudinal movement relative to said tailstock body;
    and said quill having support means for engaging the workpiece;
    said first and second engageable means of said locking means lock said tailstock body to the fixed strucutre;
    and means slidably advances said quill relative to said tailstock body after said locking means locks said tailstock body to the fixed structure to enable said support means to engage the workpiece.

17. The cutting tool according to claim 16 in which: said intensifier includes:
    a body;
    a first chamber in said body;
    a second chamber in said body communicating with said first chamber, said first chamber having a substantialy larger cross sectional area than said second chamber, the ratio of the second pressure to the first pressure being inversely proportional to the ratio of the cross sectional area of said first chamber to the cross sectional area of said second chamber;
    a first piston slidable in said first chamber;
    a second piston slidable in said second chamber;
    said first piston and said second piston being movable together;
    and means to introduce fluid from said hydraulic source into said first chamber to act on the upstream side of said first piston to move said first piston and said second piston together to increase the hydraulic fluid pressure in said second chamber to the second pressure;
    and said first supply means communicates with said second chamber of said intensifier downstream of said second piston.

18. The cutting tool according to claim 14 in which: said intensifier includes:
    a body;
    a first chamber in said body;
    a second chamber in said body communicating with said first chamber, said first chamber having a substantially larger cross sectional area than said second chamber, the ratio of the second pressure to the first pressure being inversely proportional to the ratio of the cross sectional area of said first chamber to the cross sectional area of said second chamber;
    a first piston slidable in said first chamber;
    a second piston slidable in said second chamber;
    said first piston and said second piston being movable together;
    and means to introduce fluid from said hydraulic source into said first chamber to act on the upstream side of said first piston to move said first piston and said second piston together to increase the hydraulic fluid pressure in said second chamber to the second pressure;
    and said first supply means communicates with said second chamber of said intensifier downstream of said second piston.

19. The cutting tool according to claim 14 in which: said centering means includes:
    a tailstock body mounted on the fixed structure for linear motion;

a quill slidably supported in said tailstock body for longitudinal movement relative to said tailstock body;

and said quill having support means for engaging the workpiece;

said engageable means of said locking means locks said tailstock body to the fixed structure;

and means slidably advances said quill relative to said tailstock body after said locking means locks said tailstock body to the fixed structure to enable said support means to engage the workpiece.

20. The cutting tool according to claim 14 in which said applying means includes second supply means to supply hydraulic fluid from said hydaulic source at the first pressure to said engageable means of said locking means prior to fluid being supplied at the second pressure from said intensifier.

* * * * *